(12) United States Patent
Johnson

(10) Patent No.: US 6,736,446 B1
(45) Date of Patent: May 18, 2004

(54) PORTABLE CAMPER DECK WITH A COLLAPSIBLE FRAME FOR STORAGE

(76) Inventor: Ricky Lee Johnson, 24726 Holland Ave., Morristown, MN (US) 55052

( * ) Notice: Subject to any disclaimer, the term of this patent is extended or adjusted under 35 U.S.C. 154(b) by 0 days.

(21) Appl. No.: 10/394,389

(22) Filed: Mar. 24, 2003

(51) Int. Cl.[7] ............................................. B60R 15/00
(52) U.S. Cl. ................................... 296/162; 296/26.13
(58) Field of Search .............................. 296/162, 26.13, 296/190.07; 52/79.6; 105/375, 371

(56) References Cited

U.S. PATENT DOCUMENTS

| | | | |
|---|---|---|---|
| 3,515,406 A | * 6/1970 | Endsley, Jr. | ................ 296/162 |
| 4,026,228 A | 5/1977 | Reed et al. | |
| 4,261,613 A | 4/1981 | Alford | |
| 4,279,440 A | 7/1981 | Golding, Sr. | |
| 4,869,030 A | * 9/1989 | Clark | ......................... 296/162 |
| 4,874,197 A | * 10/1989 | Grable | ........................ 296/162 |
| 4,883,306 A | * 11/1989 | Stucky | ....................... 296/162 |
| 4,981,318 A | 1/1991 | Doane et al. | |
| 5,193,878 A | * 3/1993 | Weaver | ....................... 296/162 |
| 5,383,703 A | 1/1995 | Irvine, III | |
| 5,417,468 A | * 5/1995 | Baumgartner et al. | ........ 296/162 |
| 5,423,587 A | 6/1995 | Ingram | |
| 5,899,518 A | * 5/1999 | Schreiner | ..................... 296/162 |
| 5,997,073 A | * 12/1999 | Vanderhoof | ................. 296/162 |
| 6,109,189 A | 8/2000 | Tarver | |
| 6,283,537 B1 | 9/2001 | DeVore, III | |
| 6,502,893 B1 | * 1/2003 | Corliss, Jr. | ................... 296/162 |
| 2003/0167701 A1 | * 9/2003 | Rich | .......................... 52/79.6 |

* cited by examiner

Primary Examiner—Lori L. Coletta
(74) Attorney, Agent, or Firm—John D. Gugliotta; Owen L. York, III

(57) ABSTRACT

A portable camping deck comprises a plurality of panels adjacently aligned and coupled via hinges affixed therebetween. A plurality of rollers are affixed about the lateral margins of the plurality of panels and are aligned with a pair of guide rails, the guide rails receiving and housing the rollers. A pair of housings affixed to the undercarriage of a vehicle and in mechanical communication with the guide rails so as to receive the plurality of rollers for collapsible storage of the deck beneath the vehicle.

20 Claims, 7 Drawing Sheets

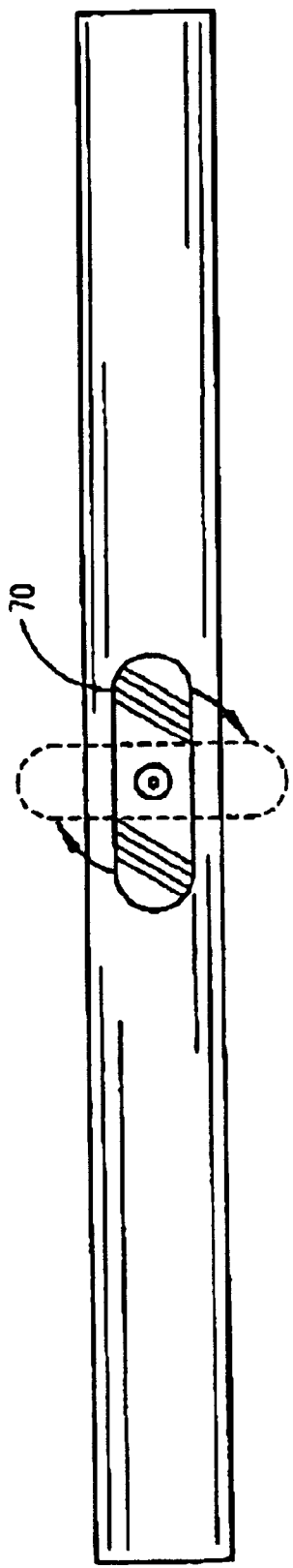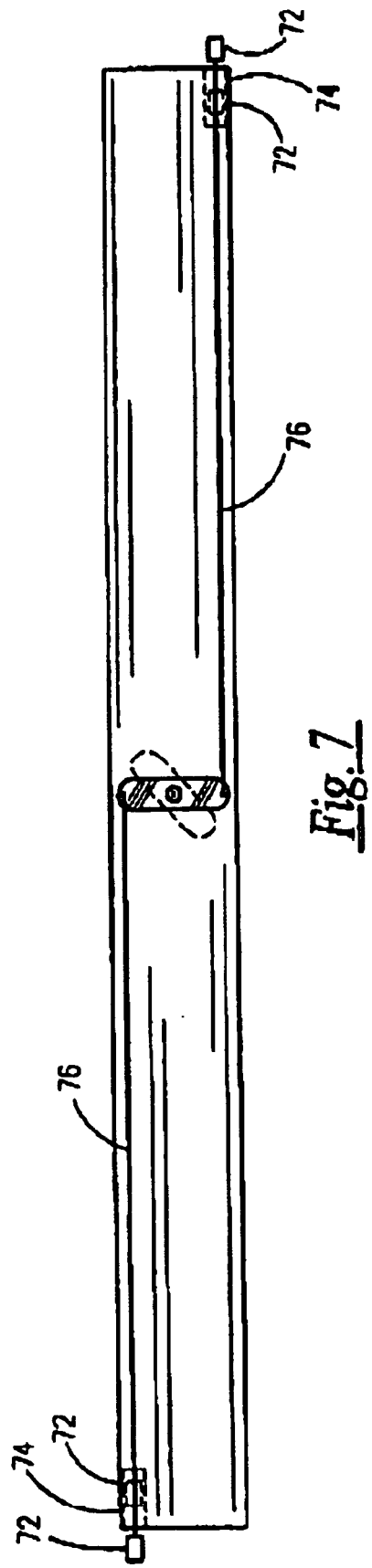

PORTABLE CAMPER DECK WITH A COLLAPSIBLE FRAME FOR STORAGE

RELATED APPLICATIONS

The present invention was first described in Disclosure Document Registration 514,468 filed on Jul. 9, 2002 under 35 U.S.C. §122, 37 C.F.R. §1.14 and MPEP §1706. There are no previously filed, nor currently any co-pending applications, anywhere in the world.

BACKGROUND OF THE INVENTION

1. Field of the Invention

The present invention is related generally to a portable deck affixed to a mobile camper, and more particular, to a concealable and collapsible deck mounted to a camper or mobile home unit and having collapsible railings.

2. Description of the Related Art

Millions of Americans enjoy camping and traveling as their preferred leisure time activity. Among these avid campers, a great deal choose to do so in recreational vehicles that range in size from small pop-up campers that are designed to be towed behind a car or truck to large motorized RV's with integral engines. While these vehicles bring their owners to the great outdoors, they often bring them to areas which are uneven, muddy and just generally unacceptable. Even if a site can be found that is covered in lush grass, after a few days of constant walking, it will begin to look worn and become muddy as well. Accordingly, there exists a need for a means by which a suitable floor surface can be provided around a recreational vehicle to permit cooking, eating and entertaining in much the same manner as a deck found on a house.

A search of the prior art did not disclose any patents that read directly on the claims of the instant invention; however, the following references were considered related:

U.S. Pat. No. 6,283,537, issued in the name of De Vore, III, discloses a multi-functional trailer comprising a core unit permanently attached to a wheel and axle assembly, wherein the core unit includes a frame with a cargo floor and means for converting to a flatbed configuration, a rigid and enclosed configuration or a tent camper configuration;

U.S. Pat. No. 6,109,189, issued in the name of Tarver, discloses a transportable modular living quarter having a ceiling, a wall and a floor comprising a planar support member, an upper support member, first anchoring means, and a second anchoring means;

U.S. Pat. No. 5,423,587, issued in the name of Ingram, discloses a camper shell for a pickup truck having a lumber rack when a covering shell is not installed, wherein the lumber rack is structured so that it may be converted to a full camper shell frame by setting in place several rafter members that are adapted to be removably mounted across the top of the lumber rack frame to define the camper top profile;

U.S. Pat. No. 5,383,703, issued in the name of Irvine, III, discloses a modular trailer for the storage and transportation of items used with a recreational vehicle comprising a trailer chassis, a hollow body mounted on the chassis, a rear door, a side door, fixed rigid interior walls, at least one modular interior wall and mounting means for interconnecting the interior walls;

U.S. Pat. No. 4,981,318, issued in the name of Doane et al., discloses a mobile service apparatus having a frame, wherein the frame includes a floor, a roof supported by the frame and overlying the floor, and at least one corner post assembly positioned to maintain the roof space above the floor;

U.S. Pat. No. 4,279,440, issued in the name of Golding, Sr., discloses a motor vehicle camper comprising a generally rectangular frame corresponding to the planar configuration of the motor vehicle, support means for releasably securing the frame to the vehicle, a first and second compartment assembly, and support means for supporting the frame, the first and second compartments in a freestanding condition when released from the motor vehicle;

U.S. Pat. No. 4,261,613, issued in the name of Alford, discloses a convertible van having a trailer hitch for towing, a trailer vehicle adapted for towing behind a van having a tow bar, and may be uncoupled from the rear of the van; and U.S. Pat. No. 4,026,228, issued in the name of Reed et al., discloses a method and apparatus for temporarily converting campers and the like to water-based units, wherein the apparatus comprises an undercarriage for engaging the bottom of a barge, elevator means attached to the undercarriage for the undercarriage above the water level and means for controlling the elevator;

Consequently, a need has arisen for a solution to this problem that allows for a cost efficient, portable and collapsible deck for a mobile home that may be concealed when not in use.

SUMMARY OF THE INVENTION

Therefore, it is an object of the invention to provide a portable camping deck stored along the undercarriage of a recreational vehicle.

It is a feature of the present invention to provide a portable camping deck having a plurality of collapsible and folding panels that provide a sturdy and durable recreational deck when deployed, and are easily folded into a storage position after use.

It is a further feature of the present invention to provide a portable camping deck having a plurality of rollers along the lateral margins of the panels so as to slidably and rotatably engage an elongated sleeves housed along a pair of linearly elongated guide rails.

It is a still a further feature of the present invention to provide a portable camping deck having a pair of storage housings provided with a spring biased lever for directional control and movement of rollers into an upper or lower covering.

It is yet a further feature of the present invention to provide a portable camping deck having telescopically adjustable legs with feet and provide so as to be foldably stored against the underside of the deck or detachably removed for storage.

It is yet a further feature of the present invention to provide optional components, such as a slidably insertable fence about the perimeter of the deck, a canopy affixable to the top of the fence, a gate for ingress and egress to the deck and a set of portable steps for easier ingress and egress to the deck.

Briefly described according to one embodiment of the present invention, a portable camping deck with collapsible frame is a retractable deck for recreational vehicles or campers. The invention provides a 3–6 foot wide by approximately 8–10 foot long area that allows for outdoor activities without having to rest on the ground. The deck floor is made from a series of panels made from lightweight, synthetic material that is easily cleaned and is not affected by water or adverse weather. It retracts via hinged sections on a pair of rails. The panels fold or collapse on one another.

When the deck is fully extended, it is supported by a set of adjustable legs that compensate for varying grade conditions. A flexible meshed or latticed railing, similar in nature to that found on toddler gates, complete with a banister top is then applied to the perimeter of the deck, along with a set of stairs to form a complete deck. The use of the portable camping deck with collapsible frame allows recreational vehicle or camper owners to enjoy outdoor activities on a deck in the same manner and convenience as a backyard residential deck.

The use of the present invention provides users with all of the materials and tools necessary to ensure the ease of assembly and maintenance.

An advantage of the present invention is that it is specifically adapted for personal use because of the light weight components and the use of inexpensive materials.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 6 is a front elevational view of the handle affixed to an end cap or the front face of a panel, with the directional rotation of the handle indicated by arrows and the unlocking position indicated in phantom;

FIG. 7 is a rear elevational view of the component described in FIG. 6, illustrating the connecting rods and pegs used for locking and unlocking the deck via the handle, wherein the unlocking movement and position is indicated in phantom;

DESCRIPTION OF THE PREFERRED EMBODIMENTS

Figure 1:
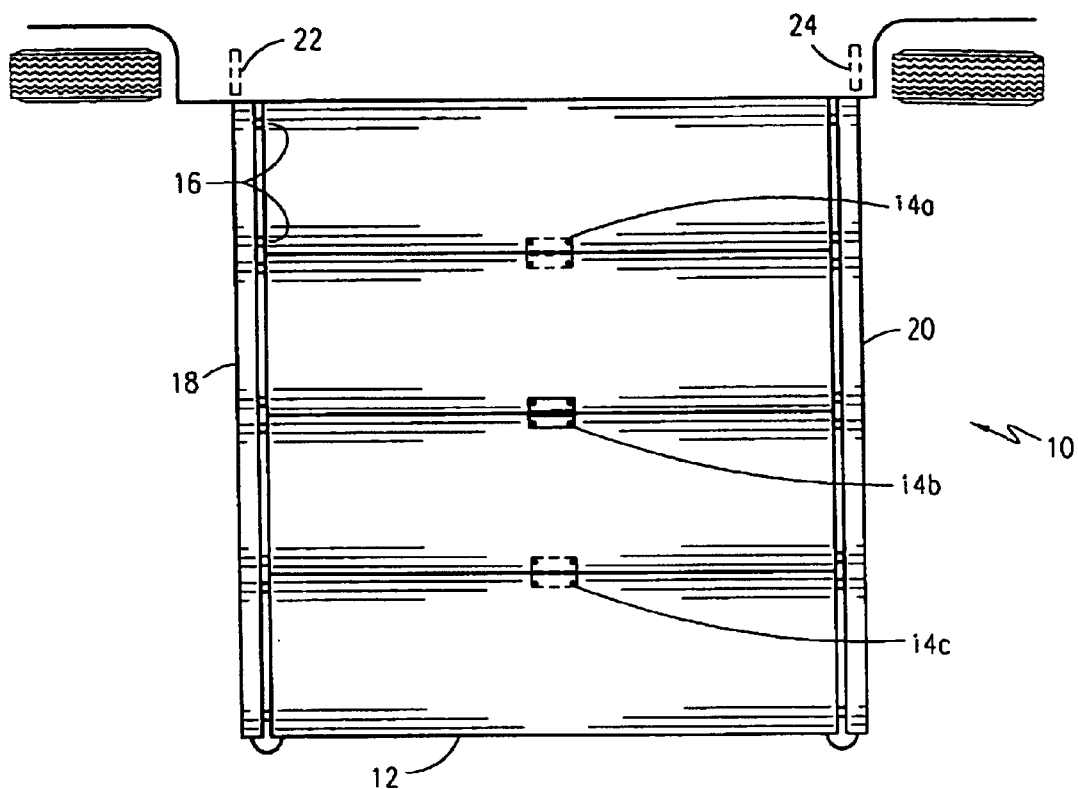
FIG. 1 is a top view of the deck expanded for use, illustrating a plurality of panels and corresponding hinges (two hinges in phantom), the pair of guide rails and the corresponding pair of housings for retaining the deck upon retraction.

The best mode for carrying out the invention is presented in terms of its preferred embodiment, herein depicted within the FIGS. 1 through 10.

1. Detailed Description of the Figures

Referring now to FIG. 1 through FIG. 7, a portable camping deck 10 is shown in accordance with the preferred embodiment of the present invention. The camping deck 10 comprises a plurality of panels 12 adjacently aligned and coupled via hinges 14 affixed therebetween. The lateral margins of the plurality of panels 12 include a plurality of rollers 16 aligned within a pair of guide rails 18 and 20, allowing the plurality of panels 12 to reciprocate between a stored position and a deployed position. The plurality of rollers 16 are arranged within a pair of housings 22 and 24 when the plurality of panels 12 are stored for transportation or non-use. A pair of telescopic legs 66 and 58 are affixed to the underside of the deck 10 so as to provide a means of supporting the outermost portion of the deck 10 and allowing for adjustment in leg height.

Each of the plurality of panels 12 has a generally quadrilateral configuration. It is envisioned that each of the plurality of panels 12 will have a rectangular configuration, dimensioned to have a greater length than depth so as to accommodate the limited storage space available on the undercarriage of a recreational vehicle. Each panel 12 is envisioned as being manufactured from a variety of materials, including metal, plastic, wood or other suitable materials. If metal or wood is chosen as manufacturing material, it is envisioned that the metal or wood are treated with a substance that is water repellant and/or contains an anti-corrosive agent to prevent deterioration of the material. If plastic is the preferred material, it is envisioned that a reinforced polymeric plastic may be best suited to provided the durability and structural integrity preferred. Each panel 12 is coupled to an adjacent panel 12 via a hinge 14 or plurality of hinges. The arrangement of hinges 14 may include a variety of forms, including the arrangement depicted in FIG. 1, in which the hinges 14 are alternately arranged on the panels 12 so that a hinge 14 is affixed to the bottom surface of the panels, then a hinge 14 is affixed to the top surface of the panels 12, and then a hinge 14 is affixed to the bottom surface of the panels 12. So long as the hinges 14 are arranged to allow the panels 12 to foldably collapse (accordion-link) into a storable unit beneath the vehicle, the specific arrangement of the hinges 13 is variable.

A plurality of rollers 16 are positioned along the lateral margins of each respective panel 12 and are aligned with a respective guide rail 18 or 20 (further described below). The rollers 16 are envisioned as having a variety of configurations, so long as the rollers 16 rotate freely within a guide rail 18 or 20 to allow slidable collapse or expansion when moved from a stored position to a deployed position, respectively, therefore the specific configuration is variable.

The pair of guide rails 18 and 20 are positioned parallel and adjacent to the lateral margins of the panels 12. The pair of guide rails 18 and 20 each comprise a linearly elongated member having a plurality of telescopic rails (depicted in FIG. 2 as having three telescopic rails 26, 28 and 30). Each pair of guide rails 18 and 20, including the plurality of telescopic rails 26, 28 and 30 (depicted as three rails, but envisioned to have less or more as required), include a linearly elongated sleeve 32 having a top collar 34 and a bottom collar 36 that face the lateral margins of the panels 12 and receive and house the corresponding rollers 16. Each successive rail 26, 28 and 30 is larger in diameter than the next, so that rail 26 adjacent to the vehicle has a larger diameter than the subsequently attached rail 28, and rail 28 has a larger diameter than the subsequently attached rail 30. Such an arrangement between the plurality of rails 26, 28 and 30 allows for the telescopic expansion and retraction or contraction of the guide rails 18 and 20, expanding to allow the panels 12 to flatten and provide a deck 10, or retracting or contracting to allow the panels 12 to collapse in a compacted arrangement for storage and/or transportation beneath the vehicle. Near or approximately adjacent to the junction adjoining each successive rail 26, 28 and 30, an aperture 38 is formed in the rails 26, 28 and 30 for receipt of a slidably insertable pin (such as a cotter pin), or spring loaded snap fastener or other suitable mechanism or impingement means 40 for mechanically interfering and impinging the telescopic movement of the rails 26, 28 and 30. Although only three rails 26, 28 and 30 were illustrated by example, it is envisioned that more or less rails may be used without departing from the spirit and scope of this disclosure, and thus will require the incorporation of more or fewer apertures 38 and mechanically interfering devices as required.

Figure 5:
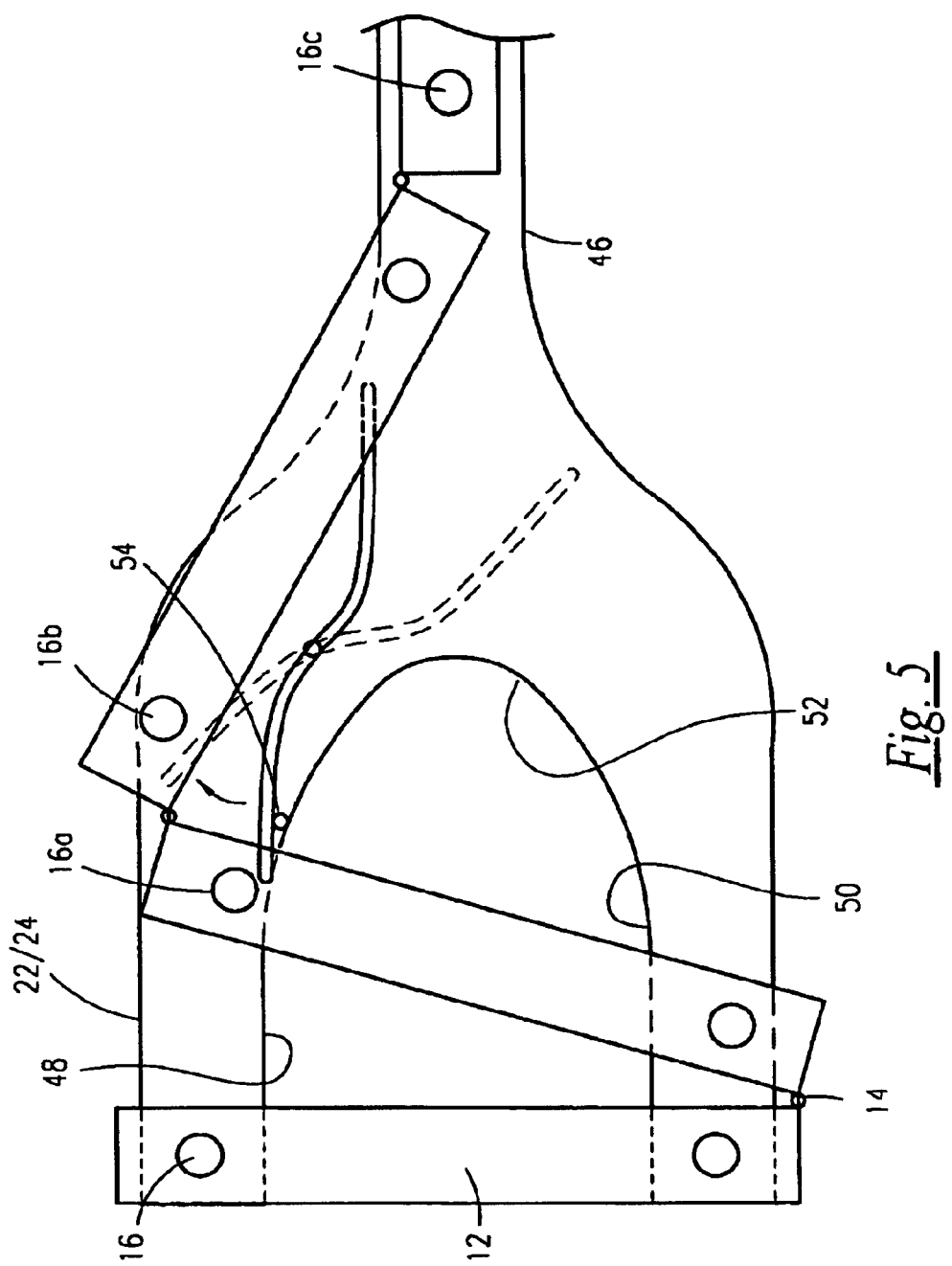
FIG. 5 is a side view of one of the pair of housings, herein depicted as a Y-shaped housing having a neck that bifurcates into an upper cover and a lower covering, and having a lever influenced by an outwardly biased spring, wherein the lever directs rollers into either the upper cover or the lower covering.

The pair of housings 22 and 24 (shown in FIG. 5 as Y-shaped housings, although a number of varying shapes are envisioned) are affixed to the undercarriage of a recreational vehicle. The housings 22 and 24 each have an elongated neck 46 in mechanical communication with a terminal portions of guide rails 18 and 20 so that the rollers 16 smoothly slide from the guide rails 18 and 20 into the neck 46. The neck 46 bifurcates into an upper chamber 48 and a lower chamber 50. As illustrated in FIG. 5, the bifurcation of the neck 46 allows rollers 16 positioned on the same panel 12 to alternately insert and slide within the upper chamber 48 and lower chamber 50, respectively. Adjacent rollers 16 (16a and 16b illustrated in FIG. 5) that are positioned on adjacent panels 12 insert and slide into the same chamber 48 or 50, assisted by the hinge 14 intermediate to the adjacent panels 12. A lever 52 is affixed within each housing 22 and 24, wherein the lever 52 comprises an approximately S-shaped or serpentine member. An outwardly biased spring 54 is affixed to the underside of the lever 52 so that when a user forcibly pushes against the panels 12 to retract for storage, the rollers 16 press the uppermost portion of the lever 52 downward and thereby compresses the spring 54 and raises the lowermost portion of the lever 52 to allow an advancing roller 16c to pass to the lower chamber 50 unobstructed. To deploy the deck 10 from the housings 22 and 24, the lever 52.works in a similar fashion as the rollers 16 pass in a reverse direction.

Figure 2:
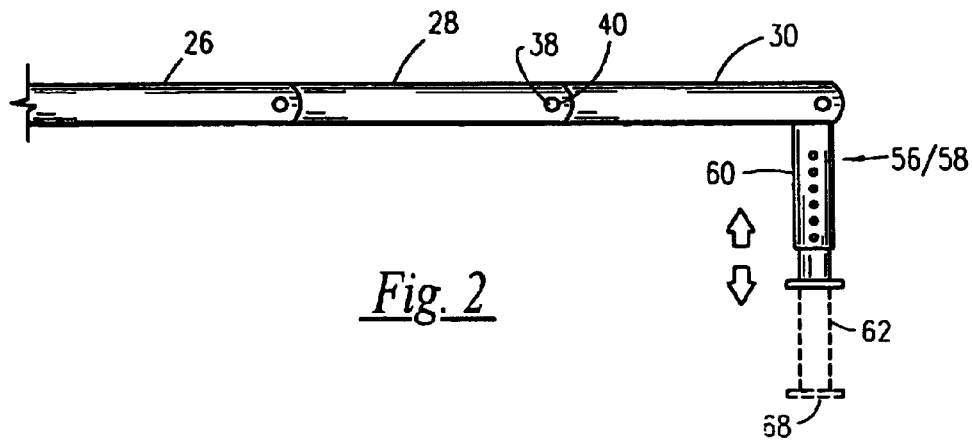
FIG. 2 is an external side elevational view of one guide rail, telescopically extended and illustrating three rails with corresponding impingement means and a telescopically adjustable leg, the opposite guide rail being a mirror image of the guide rail depicted in FIG. 2.
Figure 3:
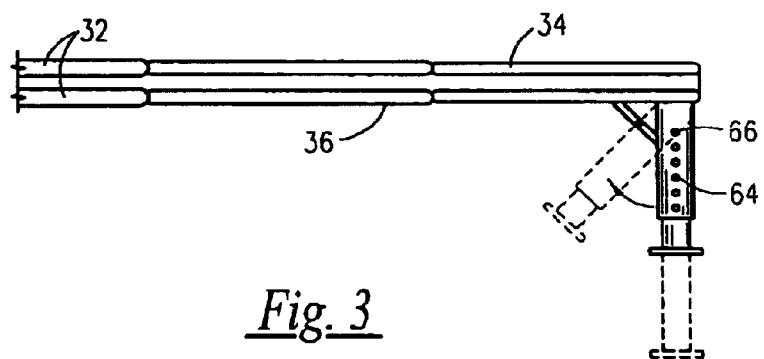
FIG. 3 is an internal side elevational view of one guide rail illustrating the elongated sleeve that is present about the length of the guide rail, the sleeve for receiving and housing rollers affixed to the panels of the deck.
Figure 4:
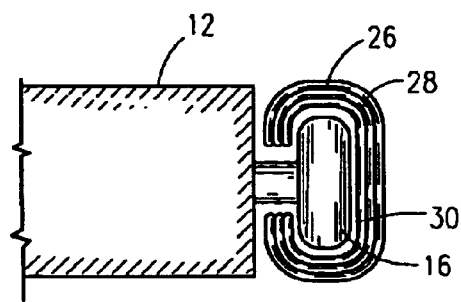
FIG. 4 is an elevational view of a panel, a corresponding roller and the rails, wherein the roller depends from the panel and is mechanically impinged within the rail by a series of sleeves, herein depicted as three sleeves having incremental variances in diameter to accommodate telescopic expansion and contraction of the rails.

Each of the pair of telescopic legs 66 and 58, as depicted in FIG. 2 and FIG. 3, include an upper cylinder 60 and a lower cylinder 62, wherein the lower cylinder 62 telescopes within the upper cylinder 60. The upper cylinder 60 has a larger cross-sectional diameter than the lower cylinder 62, thereby permitting the lower cylinder 62 to ingress to and egress from the upper cylinder 60. The upper cylinder 60 includes a plurality of orifices 64 aligned along a central midline of the upper cylinder 60. The lower cylinder 62 includes impingement means 66 (similar to the means previously described above) for inserting into one of the orifices 64, thereby mechanically impinging the lower cylinder 62 in a specific relationship with the upper cylinder 60.

The lower cylinder 62 further includes a foot 68 for providing a secure base on which the legs 56 and 58 may rest. The legs 56 and 58 may also have a collapsible hinge affixed so as to allow the legs 56 and 58 to fold against the underside of the deck 10 (as depicted in phantom in FIG. 3). Optionally, the legs 56 and 58 may be removable from the deck 10. The height adjustable telescopic legs 56 and 58 allow for a variety of deck 10 arrangements especially adaptable and suitable for varying terrains.

A handle 70 is provided along a front portion of the deck 10, intermediate to the legs 56 and 58, so that the deck 10 may be properly and safely secured within the housings 22 and 24 when use of the deck 10 is complete. In the embodiment depicted in FIG. 6 and FIG. 7, the handle 70 is rotatable to lock (shown as the insertion of pegs 72 through openings 74 provided in the housings 22 and 24. If the handle 70 is rotated in the opposite direction (shown in phantom), the pegs 72 are extracted by the displacement of the connecting rods 76 so that the pegs 72 are retracted from the openings 74. The handle 70 may be provided with a key or combination lock so that unauthorized tampering with the deck 10 is prevented. The handle 70 may be affixed to a deck panel 12 along a front face or may be affixed to a separately attached portion, such as an end cap. The connecting rods 76 may be external or internal to the panel 12 or end cap, with an internal configuration providing the connecting rods 76 protection from the environmental elements.

Figure 8:
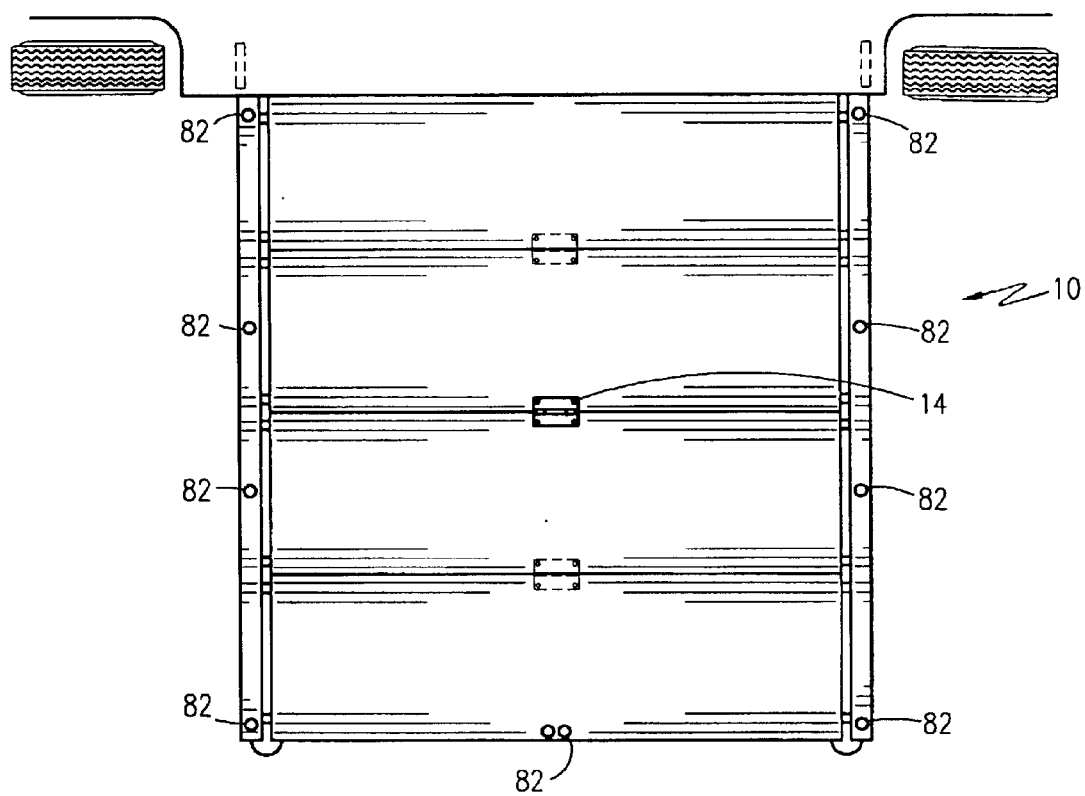
FIG. 8 is a top view of an alternative embodiment of deck having a plurality of post holes formed in the top of the guide rails to accommodate receipt of posts from a modular fence that may be attached to the deck after deployment.
Figure 9:
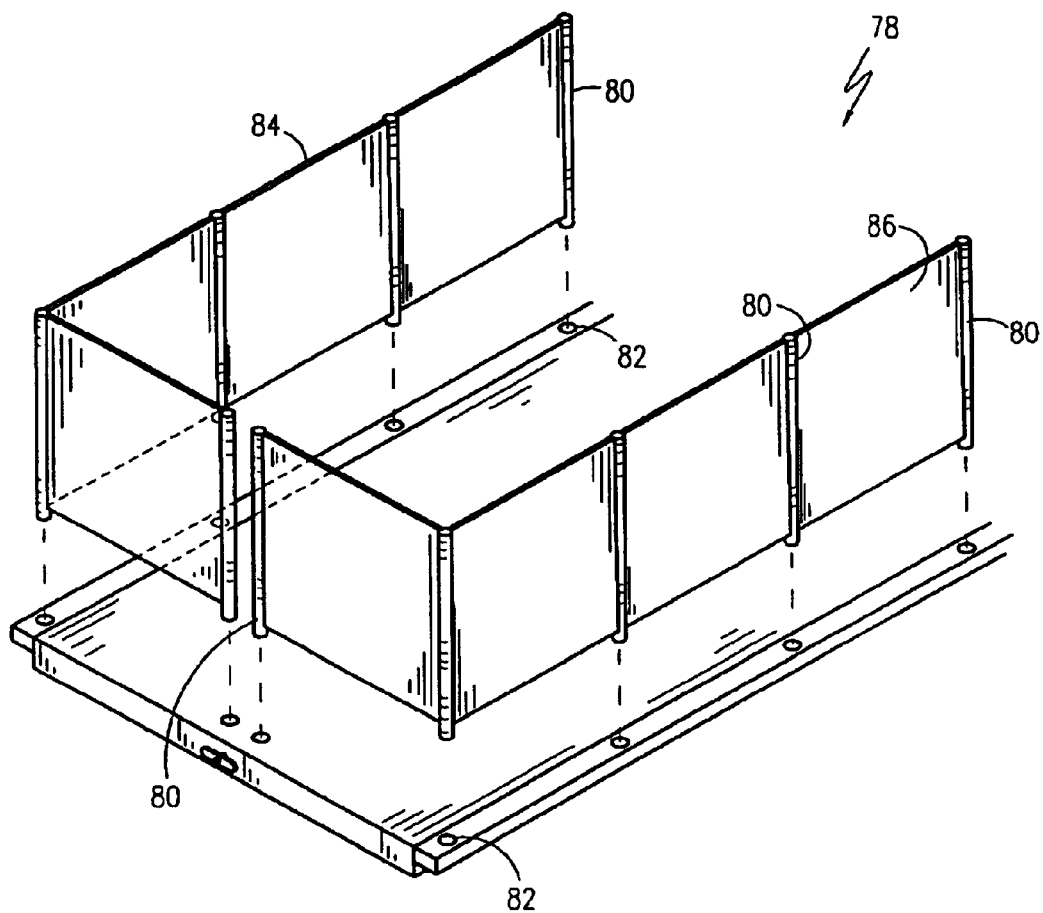
FIG. 9 is a perspective view of one envisioned embodiment of a modular fence that may be affixed to the deck via posts slidably inserted into the post holes described in FIG. 8.
Figure 10:
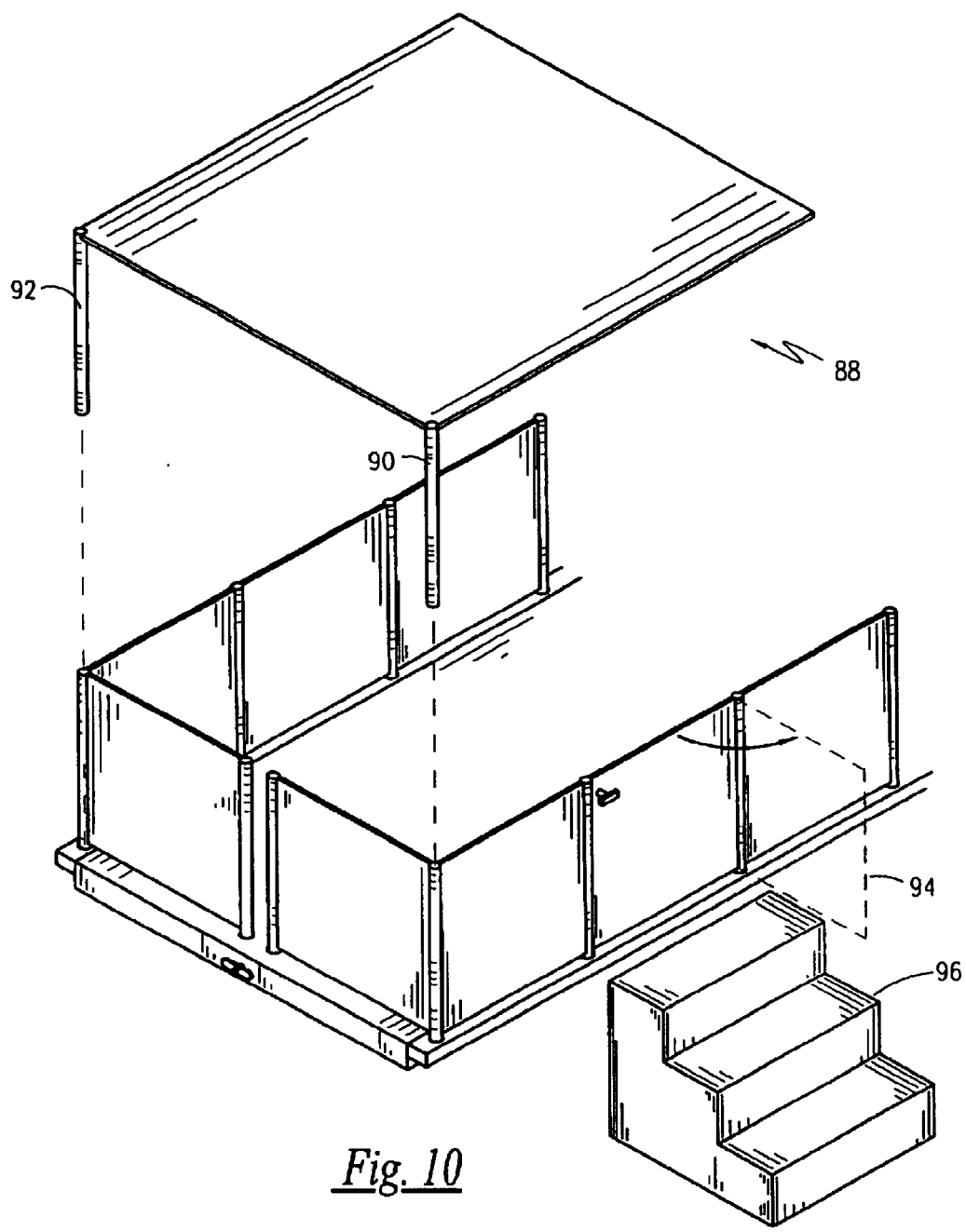
FIG. 10 is a perspective view of a canopy that may be affixed to the fence via slidable insertion of the front posts into the bannisters of the fence, and further including illustrations of a gate for the fence and a portable step.

Referring now to FIG. 8 and FIG. 9, an optional modular fence 78 may be affixed to the upper surface of the deck 10, thereby surrounding the outer perimeter of the deck 10 surface. The fence 78 includes a plurality of posts 80 insertable into a plurality of post holes 82 and top bannister 84 affixed to the posts 80. An optional screen 86 or other obstructable object may be affixed to the posts 80 and bannisters 84 so as to prevents children, pets or items from exiting the deck 10, and also providing at least a modicum of privacy, if desired.

A further option includes the attachment of a canopy 88 to the fence 78. The Canopy 88 comprises a pair of support posts 90 and 92 insertable into the top of the bannisters 84 at the front of the deck 10. The rear portion of the canopy 88 is affixed to the recreational vehicle in a variety of appropriate fashions.

A further option is a gate 94 to allow ingress and egress from the fenced in deck 10. Still a further option is the inclusion of a portable step 96 to ensure safe ingress and egress from the deck 10, if desired.

2. Operation of the Preferred Embodiment

To use the deck 10, a user will release the locking means, such as the handle with or without a keyed or combination lock. The user will then pull so that the panels 12 slide or roll and the telescopic rails 26, 28 and 30 expand and receive the rollers 16 as the panels 12 expand and unfold. The legs 56 and 58 are attached or unfolded and adjusted to accommodate the terrain of the recreational area. The fence 78 and/or the canopy 88 are affixed by slidably inserted the respective posts into the corresponding post holes. To disassemble, the user will simply perform the aforementioned steps in reverse order.

As designed, a device embodying the teachings of the present invention is easily applied. The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A portable camping deck comprising:
   a plurality of panels adjacently aligned and coupled via hinges affixed therebetween;
   a plurality of rollers affixed about the lateral margins of said plurality of panels;
   a pair of guide rails receiving said plurality of rollers and aligned therewith, said pair of guide rails aligned parallel to said lateral margins; and
   a pair of housings affixed to the undercarriage of a vehicle and in mechanical communication with said guide rails so as to receive said plurality of rollers for collapsible storage of said deck beneath said vehicle.

2. The portable camping deck of claim 1, wherein said plurality of panels comprise a quadrilateral configuration.

3. The portable camping deck of claim 2, wherein said plurality of panels are manufactured from a member selected from the group consisting of metal, plastic and wood.

4. The portable camping deck of claim 3, wherein said plastic used in construction of said plurality of panels comprises a reinforced polymeric plastic.

5. The portable camping deck of claim 3, wherein said metal used in construction of said plurality of panels comprises:
   a water repellant agent applied to said metal; and
   an anti-corrosive agent applied thereto.

6. The portable camping deck of claim 1, wherein said plurality of rollers slidably move within said pair of guide rollers so as to facilitate deployment and storage of said deck.

7. The portable camping deck of claim 1, wherein said pair of guide rails each comprise a linearly elongated plurality of telescopic rails for expansion and retraction of said pair of guide rails for deployment and storage of said deck.

8. The portable camping deck of claim 7, wherein said pair of guide rails each comprise a linearly elongated sleeve having a top collar and a bottom collar that each face said lateral margins, said sleeve receiving and housing said plurality of rollers.

9. The portable camping deck of claim 7, wherein said plurality of telescopic rails are arranged so that each successive rail distally spaced from said vehicle comprises a smaller diameter than the previous rail, thereby allowing for telescopic expansion and retraction of said plurality of guide rails.

10. The portable camping deck of claim 7, wherein each of said plurality of telescopic rails comprises an aperture formed approximately adjacent to the junction between said plurality of telescopic rails, said aperture receiving an insertable object for mechanically interfering and impinging the telescopic movement of said plurality of telescopic rails.

11. The portable camping deck of claim 1, wherein said pair of housings each comprise an elongated neck mechanically communicating with a terminal portion of each of said pair of guide rails.

12. The portable camping deck of claim 1, wherein said pair of housings each comprise a Y-shaped bifurcation from a neck portion, said bifurcation comprising an upper chamber and a lower chamber.

13. The portable camping deck of claim 1, wherein said pair of housings each further comprise:
   an approximately serpentine lever comprising an uppermost portion and a lowermost portion, said lever reciprocates between a penetrable upper chamber and a penetrable lower chamber, respectively; and
   an outwardly biased spring affixed to said lever, said spring urging said uppermost portion upward, thereby rotating said lowermost portion downward to accept a subsequent one of said plurality of rollers.

14. The portable camping deck of claim 13, wherein said uppermost portion rotates downward as one of said plurality of rollers is forcibly passed over said lever, said lowermost portion rotates upward in response, thereby allowing a subsequent one of said plurality of rollers to enter said lower chamber.

15. The portable camping deck of claim 1, further comprising a pair of telescopic legs.

16. The portable camping deck of claim 15, wherein said pair of telescopic legs each comprise:
   an upper cylinder;
   a lower cylinder, said lower cylinder having a smaller cross-sectional diameter than said upper cylinder, thereby allowing said lower cylinder to telescopically ingress to and egress from said upper cylinder.

17. The portable camping deck of claim 16, wherein said upper cylinder comprises a plurality of orifices aligned along a central longitudinal midline of said upper cylinder, said plurality of orifices receiving impingement means aligned along a central longitudinal midline of said lower cylinder, said impingement means and said plurality of orifices providing mechanical interference to a desired height setting for said plurality of legs.

18. The portable camping deck of claim 15, wherein each of said plurality of legs comprise a foot for providing a secure base on which said plurality of legs may rest.

19. The portable camping deck of claim 1 further comprising a handle positioned along a front portion of said deck, intermediate to a pair of legs, said handle comprising a rotatable lock for securely storing said deck beneath said vehicle.

20. The portable camping deck of claim 1 further comprising a modular fence, said fence affixed to the upper surface of said deck, thereby surrounding an outer perimeter of said deck, said fence comprising a plurality of posts insertable into a plurality of post holes in said deck.

* * * * *